United States Patent
Bein et al.

(10) Patent No.: US 7,802,818 B2
(45) Date of Patent: Sep. 28, 2010

(54) DEVICE AND METHOD FOR TIGHTENING A SAFETY BELT SERVING TO PROTECT OCCUPANTS IN A VEHICLE

(75) Inventors: Thilo Bein, Darmstadt (DE); Guido Fischer, Lahnstein (DE); Holger Hanselka, Darmstadt (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 360 days.

(21) Appl. No.: 11/576,696

(22) PCT Filed: Sep. 20, 2005

(86) PCT No.: PCT/EP2005/010167
§ 371 (c)(1),
(2), (4) Date: Oct. 1, 2007

(87) PCT Pub. No.: WO2006/037464
PCT Pub. Date: Apr. 13, 2006

(65) Prior Publication Data
US 2008/0061619 A1    Mar. 13, 2008

(30) Foreign Application Priority Data
Oct. 5, 2004    (DE)    ........................ 10 2004 048 455

(51) Int. Cl.
*B60R 22/34*    (2006.01)
(52) U.S. Cl. ........................ 280/805; 280/806; 280/807; 188/71.5
(58) Field of Classification Search ................. 280/805, 280/806; 297/480, 470, 476–478; 188/71.5
See application file for complete search history.

(56) References Cited

U.S. PATENT DOCUMENTS

| | | | | |
|---|---|---|---|---|
| 3,666,198 A | * | 5/1972 | Neumann | ................. 242/379.1 |
| 3,848,828 A | * | 11/1974 | Kuhl | ........................ 242/379.1 |
| 2002/0113424 A1 | | 8/2002 | Smith, Jr. et al. | |
| 2004/0021029 A1 | * | 2/2004 | Eberle et al. | ............. 242/390.9 |

FOREIGN PATENT DOCUMENTS

| | | |
|---|---|---|
| DE | 202 07 786 U1 | 5/2002 |
| EP | 1 022 201 A1 | 7/2000 |
| GB | 2 386 350 | 9/2003 |

* cited by examiner

*Primary Examiner*—Ruth Ilan
(74) *Attorney, Agent, or Firm*—Antonelli, Terry, Stout & Kraus, LLP.

(57) ABSTRACT

A belt brake is described for a safety belt for protecting occupants in a vehicle, which belt can be wound onto and unwound from a belt drum mounted rotationally about a belt shaft. A method for locking a safety belt is also described. The invention comprises at least one displaceable braking element for displacement along the belt shaft which is rotationally fixed to the belt shaft and is located between a first and a second thrust bearing. A first thrust bearing is forcibly guided along the belt shaft, thereby enabling the first thrust bearing to be transferred from a first position, in which the safety belt is wound on the belt drum with an axial distance $a_1$ between the at least one braking element and the first thrust bearing, and to a second position, in which the safety belt is at least partially unwound from the belt drum with an axial distance $a_2$ between the at least one braking element and the at least one thrust bearing where $a_2 < 1_1$. At least one actuator element is actuated in the second position to generate a braking force which acts along the belt shaft between the first and second thrust bearings and which is orientated towards the at least one braking element.

18 Claims, 5 Drawing Sheets a)

b)

DEVICE AND METHOD FOR TIGHTENING A SAFETY BELT SERVING TO PROTECT OCCUPANTS IN A VEHICLE

BACKGROUND OF THE INVENTION

1. Field of the Invention

The invention relates to a belt brake for a safety belt serving to protect occupants in a vehicle, which belt can be wound onto and unwound from a belt drum mounted rotationally about a belt shaft. Furthermore, a method is described for locking a safety belt serving to protect occupants in a vehicle.

2. Description of the Prior Art

Modern safety belt systems generally comprise a plurality of mechanically passively working systems which are intended to guarantee that the vehicle occupants are subjected to the lowest possible loads during an accident, and also have, if possible, no contact with the vehicle interior, not even with the parts which may penetrate the passenger compartment due to the impact. Almost all devices of prior art for braking or locking safety belts provide passively acting closing devices which, can be activated suddenly, independently of the accident situation and the vehicle occupants to be protected from injuries and, in particular, independently of their weight and size. Adaptive systems which guarantee braking of the safety belt, independently of the accident seat and passengers, cannot be achieved or can only be achieved at a high design cost.

In addition to the devices which are intrinsically known for belt braking only and which, in particular, are intended to prevent further unwinding of the belt from the belt drum, intelligent belt tightening systems are known which are integrated in entire sensor-supported vehicle systems, and can be actuated situation-dependently on the basis of data recorded by the sensors. For example, the ignition times of airbags and also the triggering of belt tightening systems are also influenced by these data. Reversibly operating belt tighteners force the vehicle occupants into an optimum sitting position, in which the moments of force acting on the vehicle occupants during the collision are to be kept within a largely physiologically tolerable limit. Such reversibly operating belt tighteners of prior art use electric motor drives to tighten the belt in a predetermined manner. Such a belt tightener is disclosed, for example, in DE 199 27 731 C2. Even if it is merely suspected that a collision is imminent, suitable signals activating the belt tighteners can be emitted by suitable evaluation of the data deriving from so-called pre-crash sensors in the vehicle. In this manner the distance which the vehicle occupants slide forward shortly before a collision can be reduced from up to 150 mm to 50 mm, which represents a quite considerable safety potential. Repeated tightening of the safety belts may also be advantageous if the vehicle overturns several times or if there are several impacts. However, the belt tightening system described in the above-mentioned patent specification has a multiplicity of individual components whose susceptibility influences the reliability of the entire system. Thus the acceleration and braking moment generated by the electric motor is transferred by means of a planetary gear to the belt shaft onto which the belt is wound or from which it is unwound.

SUMMARY OF THE INVENTION

The invention is a belt brake for a safety belt which serves to protect occupants in a vehicle and which can be wound onto or unwound from a belt drum mounted rotationally about a belt shaft, so that with the lowest possible number of individual components, which should each have a low failure potential, controlled unwinding movement of the safety belt will be possible, depending on the crash situation and the vehicle occupants to be protected. The unwinding of the safety belt, controlled by means of the belt brake according to the invention, should contribute to matching the occupant retardation to the accident phenomenon.

The invention uses decelerating or fully braking the rotation of the belt drum onto which or from which the safety belt can be wound and unwound respectively in the event of a crash, where a principle similar to the disc or multiple-disc brake is applied to retard or brake the safety belt during the unwinding of the safety belt from the belt drum along the rotating belt shaft, which applies, by friction contact, braking forces required for braking the belt drum. By providing preferably a multiplicity of individual braking means along the belt shaft, which are preferably designed on the firm of disc or multi-disc brakes, friction pairs are produced between which a moment acting on the belt shaft can be generated by the controlled production of axially acting normal forces.

At least one actuator element, which has a short response time and whose actuator forces can be transferred directly to the braking means, is required to produce braking forces acting between the braking means arranged along the belt shaft. This presupposes that the actuator element is positioned in the spatially immediate vicinity of the braking means arranged along the belt shaft. Here the mutual distances between the friction pairs must be chosen as short as possible to ensure that if possible no reaction paths, or only short reaction paths need be taken into consideration. On the other hand a largely resistance-free unwinding of the safety belt from the belt drum should be possible for reasons of practicable use of the safety belt while being worn and also to guarantee largely unrestricted movement of the vehicle occupant when wearing a safety belt, that is at least one actuator element may not exert any braking effect on the braking means arranged along the belt shaft when not actuated, that is in the normal case as distinct from the crash case.

The belt brake according to the invention is designed so that at least one braking means, mounted so that it can be displaced along the belt shaft and is connected in a rotationally fixed manner to the belt shaft, is provided and is arranged between a first and a second thrust bearing. A means actively connected at least to the first thrust bearing ensures that the first thrust bearing is forcibly guided along the belt shaft according to the winding up or unwinding of the safety belt onto or from the belt drum, thereby enabling the first thrust bearing to be transferred out of a first position, in which the safety belt is wound onto the belt drum and there is an axial distance $a_1$ between the braking means and at least one thrust bearing, into a second position in which the safety belt is at least partially unwound from the belt drum and there is an axial distance $a_2$ between the braking means and at least one thrust bearing, the distance $a_2$ being shorter than the distance $a_1$. The braking means delimited by both thrust bearings are not in mutual friction contact in either position, which means that in both positions largely free-running winding and unwinding of the belt onto and from the belt drum is possible. Furthermore, at least one actuator element is provided which, when actuated in the second position, generates a braking force acting along the belt shaft between the first and second thrust bearing and directed towards the at least one braking means.

Due to the reduction according to the invention of the axial distance along the belt shaft between the at least one braking means and the two axially opposing thrust bearings, a situation is created in which the actuator element, when actuated, must perform a slightly axial actuator movement which gives rise to the braking force directed to the at least one braking means. The braking paths required for application of the braking force can be minimized by the thrust bearings, which are spaced only a short distance apart and the at least braking means provided between them, thereby decisively reducing the response time of the braking mechanism.

In principle all those elements which are capable of applying the axial braking forces described above, by way of a translation movement or change in shape, are suitable as actuator elements. For instance electric motor drives, which are capable of generating forces acting axially on the thrust bearings in such a manner that they can be reversibly applied by means of a lifting mechanism, may be chosen for this purpose. What is of particular interest, however, is the use of so-called converter materials which undergo a spontaneous change of form due to the application of energy, this change being specifically useful for the axial generation of braking forces. Any types of converter materials may be suitable, for example piezo ceramics, piezo polymers, electrostrictive ceramics, electrorheological fluids, polymer gels, magnetorheological fluids, shape memory alloys or shape memory polymers. Of the above-mentioned converter material classes, all those materials which have a solid phase and can be activated by the supply of electrical energy, are particularly suitable. Fluidic converter materials are equally suitable but they have to be accommodated in suitable encapsulations for them to be used as actuator elements.

In a preferred exemplary embodiment of the belt brake according to the invention, staked actuators of piezoceramic materials may be used which, when an electrical voltage is applied, undergo a variation in length proportional to the electrical voltage. The variation in length, in the presence of an external mechanical force, generates proportional compressive forces which, according to the invention, are used to supply the braking forces. Although the forces that can be generated due to the length extension of piezo stacked actuators are very high relative to the applied electrical energy invested, such materials need only expand very short distances. It is necessary to take into consideration these properties on which the converter materials are based when they are used as actuator elements within the framework of the belt brake. Any distance along which the converter material is capable of expanding must be regarded as a loss of force potential if the converter material is able to expand without external mechanical force. It is therefore necessary to minimize any tolerances, assembly and functional clearances between the converter element and the thrust bearings in order to obtain an immediate force effect between the thrust bearings and the braking means located between them during the longitudinal expansion of the actuator element.

Since the operator friendliness of the safety belt should be uninfluenced by the belt brake according to the invention, the process of the safety belt unwinding from and winding onto the belt drum should take place in an unobstructed free run. It is therefore necessary to allow a free gap of several tenths of a millimeter between the thrust bearings actively connected to the belt shaft and the at least one braking means which cannot be closed by the longitudinal expansion of the piezo staked actuators. For this reason the belt brake according to the invention provides a type of differential design which enables the intermediate gap required for free running of the safety belt to be closed by merely actuating the safety belt, and on the other hand achieving the application of braking force exclusively by activating the actuator. Any assembly and functional clearances are overcome by a mechanical means which, as will be described in the following with reference to the exemplary embodiments, is designed in the form of a cam plate or a spindle with a sliding nut which because of a functionally determined rotation of the belt shaft, initiated by the unwinding or winding of the safety belt, is able to convert the rotational movement to a translatory movement axially to the belt shaft. Due to the translatory movement in the axial direction to the belt shaft, the distance between both thrust bearings is reduced in order to minimize any intermediate gaps between the thrust bearings and the at least one braking means, so that although on the one hand a minimum freedom of movement of the braking means relative to the thrust bearings is still guaranteed, this ensures on the other hand that the frictional surfaces provided between the braking means come into contact without force with each other and with the corresponding thrust bearings. In this position, which can be achieved merely by manual actuation of the safety belt by unwinding it from the belt drum, the longitudinal extension of the piezo actuators orientated axially towards the belt shaft is able to generate a braking force between the corresponding braking means and the thrust bearings. The frictional contact caused by the longitudinal expansion between the braking means and the thrust bearings results in a braking moment acting on the belt shaft, the size of which may ultimately be selected by the choice of electrical voltage applied to the piezo actuators. The belt brake according to the invention therefore provides the possibility of a freely selectable modulation of the braking forces, and, in particular, the braking force can be repeatedly reduced and regenerated according to the accident situation.

Data from pre-crash sensors is preferably used for actuating the piezo actuators in order to generate suitable braking forces even before the crash energy becomes active. It is also possible to perform the unwinding movement of the safety belt in a controlled manner, particularly in the event of a crash. For example, controlled unwinding of the safety belt may contribute to matching the occupant retardation to the accident process. The vehicle occupants could be given free space, instead of the conventional mechanical control, particularly at lower crash speeds, so that the retardations are reduced, which has a positive influence on the severity of injuries. Even at high crash speeds a controlled belt force-time curve may contribute to reducing acceleration peaks and therefore of optimizing occupant protection.

Like the transfer of the belt brake from the initial condition, in which the safety belt is fully wound onto the belt drum and the components of the belt brake described above have a mutual axial clearance, to the prestressed condition in which the components of the belt brake lie largely clearance free axially along the belt shaft of the belt brake, the first condition can be assumed by merely winding the safety belt onto the belt drum automatically. The transfer of the belt brake to the conditions described above therefore takes place by operating the safety belt manually only, and therefore requires no further handling. The braking system according to the invention is therefore operator friendly, particularly as no handling is required other than that previously found in safety belt systems of the prior art.

Although the number of components constituting the belt brake according to the invention is small and their functional reliability is very high, the belt brake according to the invention has an automatically operating interlocking mechanism which is provided for situations where the actuator elements are not actuated, for example in the case of little or no energy supply for controlled actuation of the actuator elements. In this case the means already described for axial displacement of the first thrust bearing, which is again actively connected to it as the safety belt, is further unwound from the belt drum, so that the first thrust bearing is moved axially in the direction of the second thrust bearing and a braking force acting between the two thrust bearings on the at least one braking means is generated.

The belt brake according to the invention is therefore based on a new type of method for locking a safety belt in which the belt drum is locked by means of a converter material to which energy is supplied and which is brought into contact with a braking means connected in a rotationally fixed manner to the belt drum. In this case the belt drum is transferred from a first condition, in which the safety belt is wound onto the belt drum and in which unbraked winding and unwinding of the safety belt is possible, to a second condition by at least partial unwinding of the safety belt, in which condition the converter material causes immediate locking of the belt drum after energy is supplied.

BRIEF DESCRIPTION OF THE DRAWINGS

The invention is described in exemplary fashion below, without limiting the general inventive concept, using exemplary examples and with reference to the drawings, in which.

DETAILED DESCRIPTION OF THE INVENTION

Figure 1:
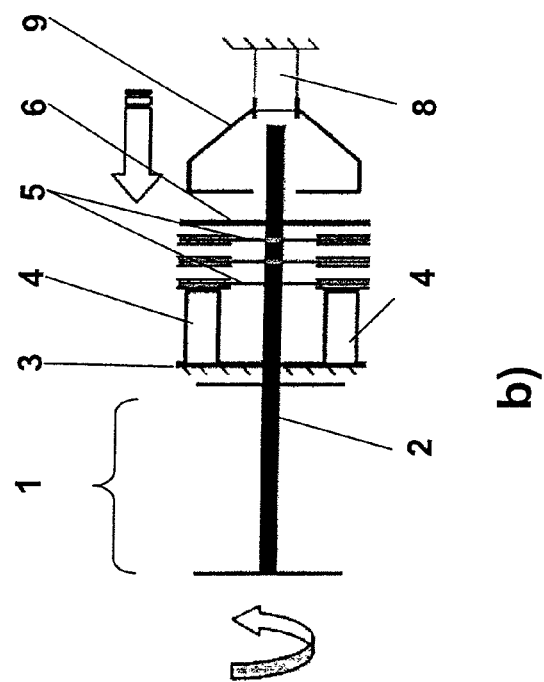
FIGS. 1a and b show explanatory sketches of a belt drum with a running motor and spindle in a first position (a) and second position (b)
Figure 1:
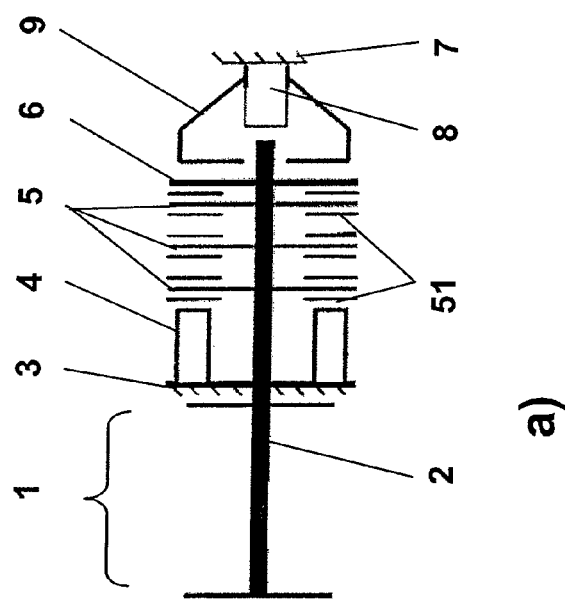

FIGS. 1a and b show a schematized belt brake which, in the case of FIG. 1a, is in the first position, that is in the state of rest, in which the safety belt (not shown) is wound more or less completely onto belt drum 1. Belt drum 1 has a belt shaft 2, which projects unilaterally from belt drum 1, along which are arranged subsequent components comprising the belt brake 5. A thrust bearing 3, which is not necessarily arranged in a rotationally fixed manner, but with a fixed axial position relative to belt shaft 2, is provided immediately adjacent to belt drum 1. Thrust bearing 3 is preferably designed in the shape of a disc and has at least two and preferably a multiplicity of actuator elements 4 distributed uniformly along the disc on the disc side facing away from belt drum 1. The actuator elements are each advantageously piezo stacking actuators discs of the brake, which are connected in a rotationally fixed and axially displaceable manner to belt shaft 2, are connected along belt shaft 2. The braking means 5, designed as brake discs, has annularly designed brake linings 51 facing each other and fitted so that they mutually overlap in the axial direction. Finally, a further thrust bearing 6 is fitted to belt shaft 2 so that it can be axially displaced.

In fixed axial spatial association with belt shaft 2, a spindle 8 is fitted to a fixed thrust bearing 7, having a male thread by which a slide nut 9 is freely connected to spindle 8. Slide nut 9 is in turn connected in a detachably rotationally fixed but axially displaceable manner to belt shaft 2. The slide nut 9 is displaced axially towards belt shaft 2 when belt shaft 2 rotates due to the predetermined pitch of the male thread of spindle 8. In the state of rest shown in FIG. 1a, it is assumed that the safety belt (not shown), is at least partially wound onto belt drum 1. Slide nut 9 is in a position that is retracted fully in the axial direction on spindle 8. It cannot be seen in FIG. 1a that slide nut 9 is actively connected to thrust bearing 6 and also maintains a position that it is not located far from the opposing thrust bearing. Brake discs 5 located between thrust bearings 3 and 6 have a mutual separation distance in the region of several tenths of a millimeter, and guarantee belt drum 1 resistance-free running about belt shaft 2.

By actuating the safety belt by unwinding it from belt drum 1, the axial displacement of slide nut 9 performs an axially directed movement of thrust bearing 6 in the direction of the axially fixed thrust bearing 3, which reduces the mutual distances between brake discs of the brake 5. FIG. 1b shows a so-called prestressed condition in which brake discs of the brake 5 come into mutual axial contact which is largely free of forces. The active connection that exists between slide nut 9 and thrust bearing 6 in the stressed condition is such that further unwinding of the safety belt from belt drum 1 does not necessarily result in further axial movement of slide nut 9 caused by controlled forward bending of the vehicle occupant, for example for the purpose of removing objects from the glove compartment, preventing locking of the belt brake.

In the prestressed condition shown in FIG. 1b, the thrust bearings 3 and 6 assume an axial position that is fixed in relation to belt shaft 2, and in which brake discs of the brake 5 enclosed between them lock largely without intermediate clearance. In this position, it is possible for an immediate axially directed braking force to act on brake discs of brake 5 due to longitudinal expansion of actuators 4 which can be activated in a controlled manner. The discs generate a braking moment acting on belt drum 1 due to the rotationally fixed connection of brake discs of brake 5 to belt shaft 2. In this case further unwinding of the safety belt from belt drum 1 is not possible. It also be readily understood, with reference to FIG. 1b, that the braking force acting between brake discs of the brake 5 can be suitably modulated by controlled longitudinal expansion of actuator elements 4, depending on the crash situation. In particular, it is possible to increase the braking force and reduce it again as often as required.

If actuator elements 4 cannot be activated due to a fault, it is necessary to make an active connection between slide nut 9 and thrust bearing 6 so that thrust bearing 6 is continuously moved against thrust bearing 3 due to further unwinding of the safety belt, which results in continuous clamping of all brake discs of brake 5, which means that the braking moment can also be increased. The active connection required between slide nut 9 and thrust bearing 6, which, as mentioned above, should be opened in the prestressed state and must be suitably restored in an emergency. A mechanical interlock between belt shaft 2 and guide 9, similar to the currently used interlocking mechanisms in conventional belt systems, is advantageously suitable for this purpose. In principle the connection between slide nut 9 and belt shaft 2 should be made mechanically, and apart from the actuators as few electronic components as possible should be used to increase fail safety. For example, the emergency interlock could be achieved with electromagnets which cause the interlock to come into operation in the event of a power failure.

Figure 2:
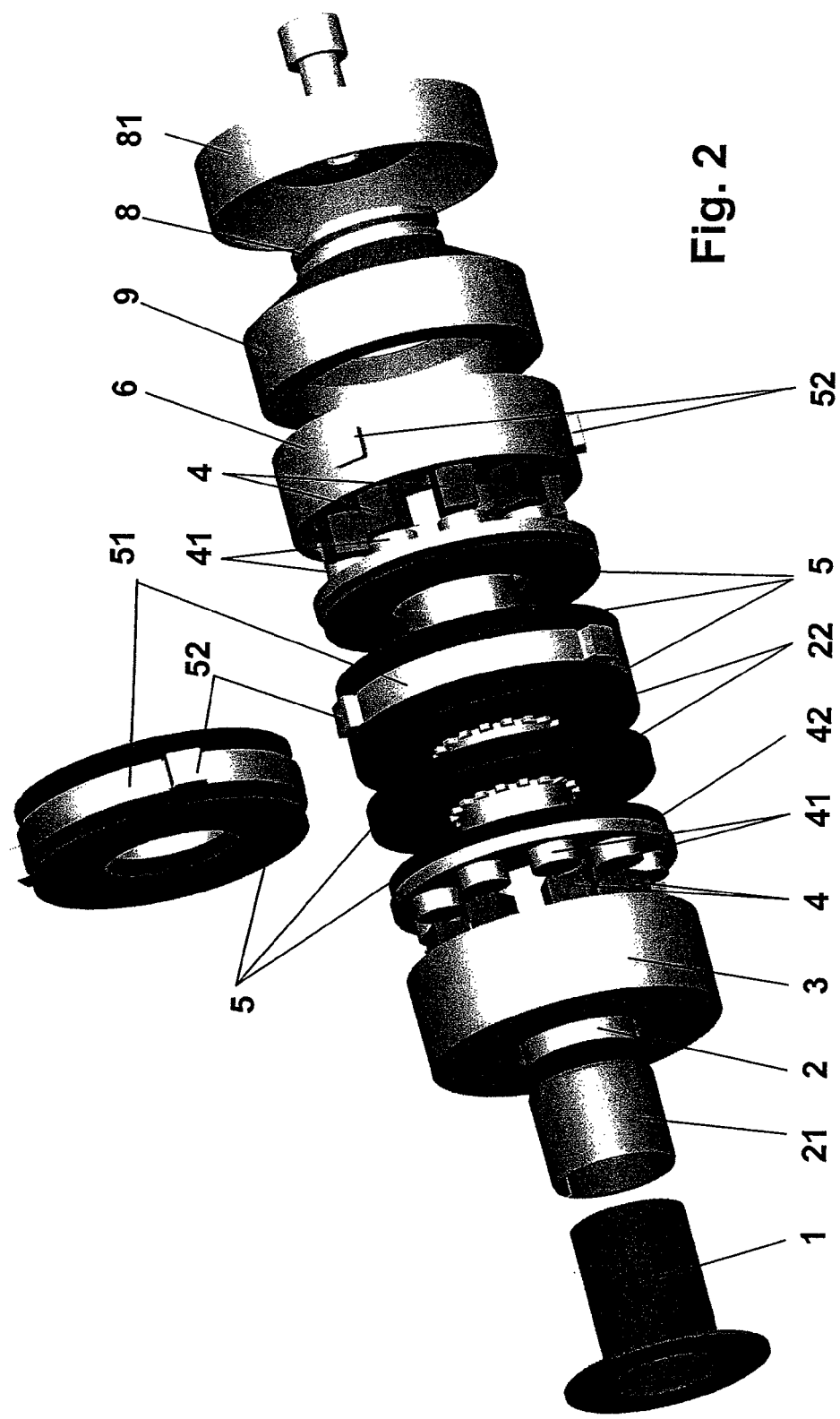
FIG. 2 shows a diagrammatic representation of a belt brake arrangement.

FIG. 2 shows, as part of a diagrammatic exploded view, all the components required for constructing a belt brake. Thus belt drum 1 is not necessarily connected integrally to belt shaft 2 projecting laterally from belt drum 1. Instead it is possible to connect belt drum 1 to belt shaft 2 in a rotationally fixed manner, for example by means of a flanged connection in the form of a sliding bearing 21. This enables the belt brake according to the invention to be adapted in a modular manner to the existing belt drums.

Thrust bearing 3, on whose disc surface faces away from belt drum 1, is provided with an annular arrangement of a multiplicity of individual stacked piezo actuator elements 4 and is connected in an axially fixed manner to belt shaft 2. Actuator elements 4 face axially towards corresponding thrust bearing surfaces 41, which are in turn fitted on the rear side to an annular disc 42 which ensures that actuator elements 4 are not subject to torsional clamping forces. Furthermore, provided on the belt shaft 2 are brake discs of the brake 5, which are connected in a fixed manner either to annular disc 42 or to further annular elements 51, or are fitted individually along groove guides 22 fitted to belt shaft 2 in an axial direction in a rotationally fixed but axially displaceable manner.

In addition to brake discs of the brake 5 connected in a rotationally fixed manner to belt shaft 2, the further annular elements 51 have plug-pin pins 52 fitted to the peripheral edge. The pins are shown in the following description to engage in corresponding recesses of the housing and are thereby uncoupled from the rotation of belt shaft 2.

Also provided along belt shaft 2 is thrust bearing 6, having actuator elements 4 also suitably fastened thereto, which as in the case of thrust bearing 3 are also positioned opposite corresponding receiving structures 41 in the axial direction. Slide nut 9, with a spindle 8 that can be brought into engagement, is also shown in a schematized manner. Component 81 represents a housing cover which accommodates the slide nut-spindle mechanism for protecting it against contamination.

Figure 3:
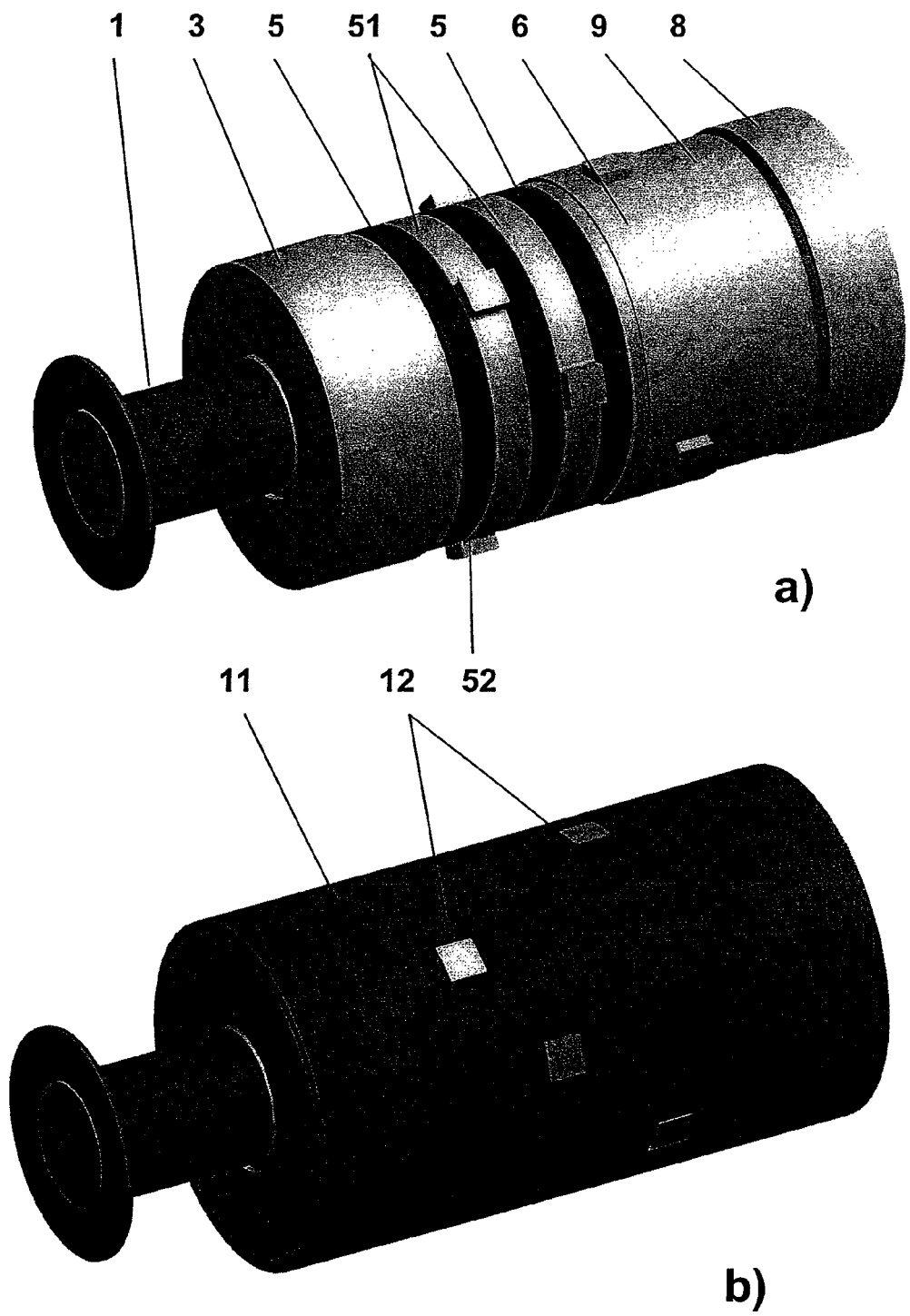
FIGS. 3a and b show a belt brake arrangement without housing (a) and with housing (b)

FIG. 3a shows the individual components shown in FIG. 2, jointed together and identified with the reference numbers as previously described. FIG. 3a shows the extremely compact design of the belt brake in a state of rest because of the intermediate gap indicated between brake discs 5 and between thrust bearing 3 and the intermediate gap between thrust bearing 6 and annular discs 51. Plug-pin pins 52, fitted along the peripheral edges of annular discs 51 and thrust bearing 6, project into corresponding recesses 12 of a housing 11, which is shown in FIG. 3b. Housing 11 is connected in a fixed manner to thrust bearing 3 and is connected in a rotationally fixed manner to components 51 and thrust bearing 6 by the plug-in pin connection. Because of a recess in openings 12 inside housing 11, dimensioned larger in the axial direction, plug-in pins 52 are able to perform an axially directed movement enabling the belt brake to be transferred from the state of rest to the prestressed condition, as already described.

Figure 4:
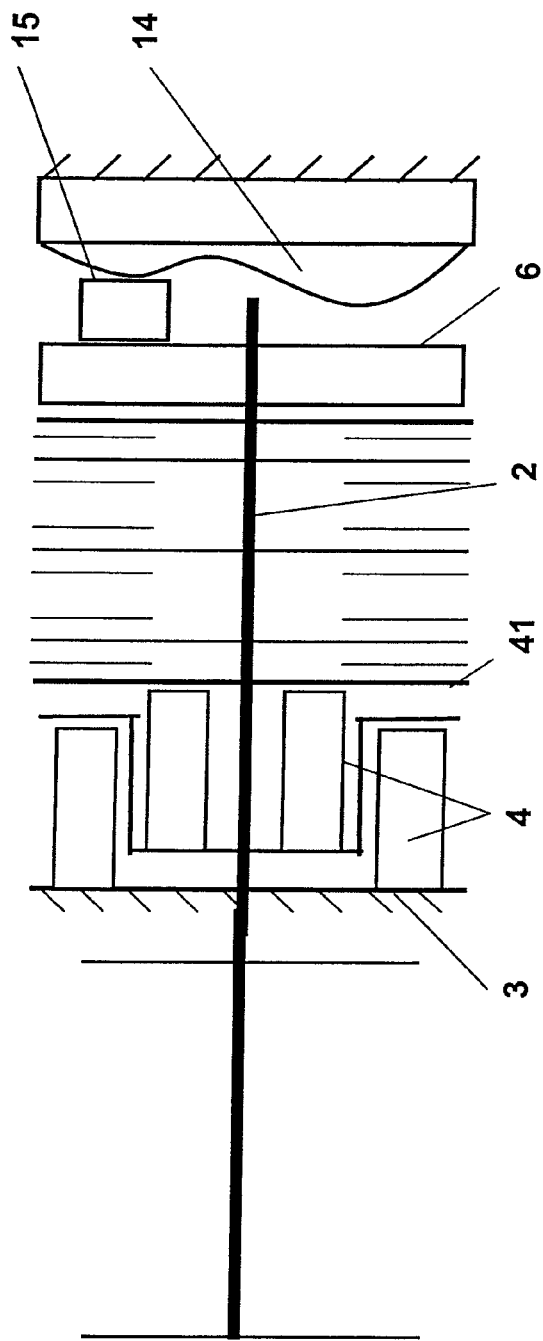
FIG. 4 shows a schematized representation of a belt brake with a cam plate.
Figure 4:
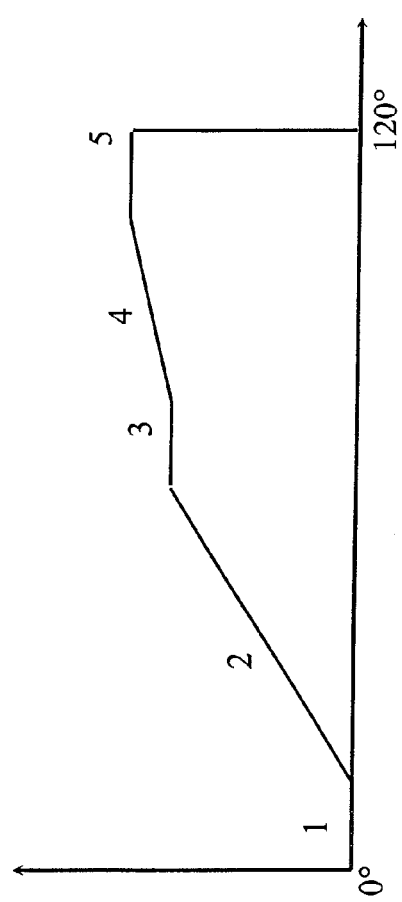
Figure 5:
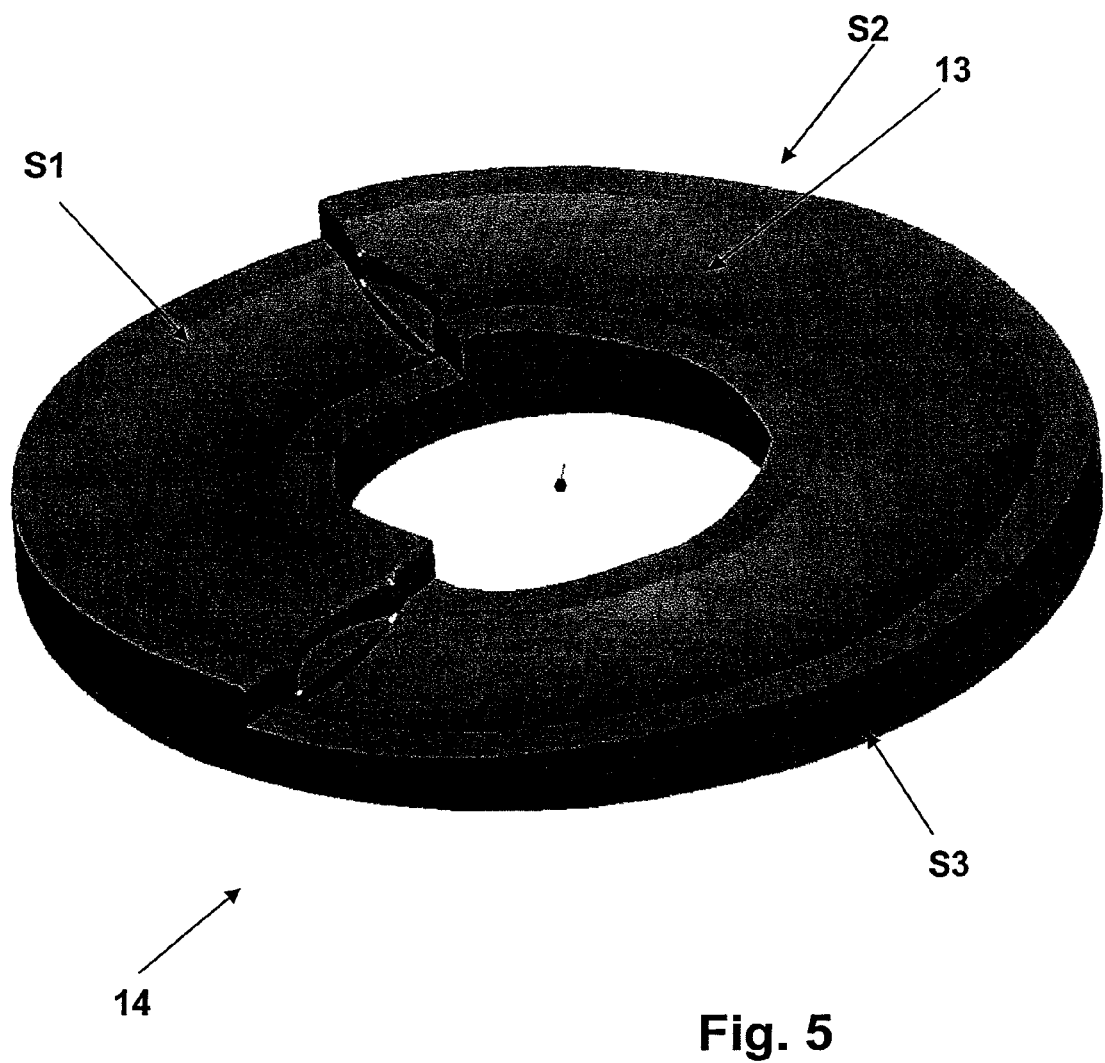
FIG. 5 shows a cam plate

FIG. 4 shows a schematized representation of a further exemplary embodiment of a belt brake which initiates the longitudinal movement of thrust bearing 6 with a so-called cam plate 14 instead of the slide nut described above. The cam plate, which is shown as an individual part in FIG. 5, has three segments S1, S2 and S3, each of which have a radial measure of 120°. Along each individual segment the cam plate has a pitch profile according to the diagrammatic representation in FIG. 4, along which a rolling or sliding body 15, is actively connected indirectly or directly to thrust bearing 6 of the belt brake. For example, rolling body 15 is designed as a ball which unrolls along a concave profile form 13 which is worked into the three segments inside cam plate 14.

In the diagrammatic representation shown in FIG. 4 a sliding element 15 is provided between thrust bearing 6 and cam plate 14, which element can be temporarily connected to belt shaft 2 mechanically in a rotationally fixed but axially displaceable manner. Sliding element 15, designed as a rolling body, is actively connected to cam plate 14 and is forced to unroll when rotating along the profile of cam plate 14.

As in the exemplary embodiment in FIG. 1, an arrangement of brake discs 5 is located between thrust bearings 3 and 6. In the exemplary embodiment shown in FIG. 4, however, actuators 4 are only actively connected to thrust bearing 3. A preferred arrangement of piezo stacking actuators 4 provides a finger-like toothing of individual actuators fastened to thrust bearing 3 in the peripheral direction.

The following conditions of the belt brake are described with reference to the graph shown in FIG. 4, which reproduces the cam plate profile for each segment. Thus the graph shows along its X-axis the regions of a profile segment at angle values of 90° to 120°, and the pitch of the cam profile of the cam plate is plotted along the X-axis.

Region 1 represents the position of rest of the belt brake which it assumes, for example, when fastened. The belt drum runs freely.

Region 2 ensures that sliding element 13 moves axially when the unit is activated. If the drum is rotated far enough, sliding element 15 moves into region 3 which is the actually functional region. In this region a defined prestressing level is ideally reached in which any mechanical and production clearances are overcome and the actuators are able to apply force despite their limited stroke. The mechanical connection between belt shaft 2 and sliding element 15 is separated. If there is a power failure, the mechanical connection is restored. Sliding element 15 is transferred to region 4 and this results in a braking of the system. The further the belt tends to unwind the greater will be the axial movement and hence the braking effect. The next segment begins in region where it is possible for the sliding element 15 to change segments but for which there is no sudden opening.

LIST OF REFERENCE NUMBERS

1 Belt drum
2 Belt shaft
21 Sliding bearing
3 Thrust bearing
4 Actuator elements
41 Receiving structures
5 Braking means, brake discs
51 Annular disc
52 Plug-in pin
6 Thrust bearing
7 Fixed thrust bearing
8 Spindle
9 Slide nut
10 N.N.
11 Housing
12 Openings
13 Concave profile shape
14 Cam plate
15 Rolling body or sliding element

The invention claimed is:

1. A belt brake for a safety belt serving to protect occupants in a vehicle, which belt can be wound onto and from a belt drum mounted rotationally about a belt shaft, comprising:
at least one braking means displaceably mounted longitudinally to the belt shaft, connected to the belt shaft in a rotationally fixed manner and located between a first and a second thrust bearing;
means, connected to at least the first thrust bearing, for forcibly guiding the first thrust bearing along the belt shaft in response to a winding or an unwinding of the safety belt onto or from the belt drum, to transfer the first thrust bearing from a first position at which the safety belt is wound onto the belt drum and at which an axial distance $a_1$ exists between the braking means and at least one of the first and second thrust bearings, to a second position at which the safety belt is at least partially unwound from the belt drum and at which an axial distance $a_2$ exists between the braking means and the at least one thrust bearing, with $a_2 < a_1$; and at least one actuator element which, when actuated in the second position, produces a braking force which acts longitudinally on the belt shaft between the first and second thrust bearings and which is directed towards the at least one braking means.

2. The belt brake according to claim 1, wherein the at least one actuator element comprises a material selected from the group consisting of: a piezo ceramic, a piezo polymer, a electrostrictive ceramic, a electrorheological fluid, a poly marl, a magnetorheological fluid, a shape memory alloy and a shape memory polymer.

3. The belt brake according to claim 1, wherein the actuator element is a piezoelectric stacked actuator.

4. The belt brake according to claim 1, wherein the actuator element, when actuated, undergoes a longitudinal expansion by a dimension that is greater than $a_2$ and smaller than $a_1$.

5. The belt brake according to claim 1, wherein the at least one braking means is a multibrake disc which has a brake lining at least on one side.

6. The belt brake according to claim 1, wherein the means is a slide nut with a spindle, with a spindle axis located flush with the belt shaft in the axial direction, and the slide nut is rotationally fixed to the belt shaft, but axially displaceable relative to the belt strap and engages the spindle with threads.

7. The belt brake according to claim 1, wherein the means is a cam plate which is connected in a rotational and an axially fixed manner to the belt shaft and is actively and axially connected to the first thrust bearing by at least one rolling body.

8. The belt brake according to claim 7, wherein the cam plate has a concave running path or a plurality of concave shaped running path segments on a surface facing axially towards the first thrust bearing, in the which segments are guided by at least one rolling body contacting a surface of the first thrust bearing facing towards the cam plate.

9. The belt brake according to claim 1, comprising a plurality of braking means located between the first and second thrust bearings, which do not have individual contact axially in the first position, and in which pairs of the braking means contact each other with a force between each other in the second position.

10. The belt brake according to claim 1, wherein the second thrust bearing is axially fixed to the belt shaft.

11. The belt brake according to claim 1, wherein the first and second thrust bearings, the at least one braking means between the two thrust bearings and the means are located on a section of the belt shaft projecting on one side from the belt drum.

12. The belt brake according to claim 1, wherein in the second position the means is separated from the first thrust bearing and the first thrust bearing is self-inhibiting in the second position.

13. The belt brake according to one of claim 1, comprising:
pre-crash sensors located on the vehicle enable the at least one actuator element to be actuated.

14. A method for locking a safety belt for protecting occupants of a vehicle who wind and unwind the safety belt during occupancy of the vehicle on and off a belt drum coupled to rotate with a belt shaft to which a braking force may be applied by a brake for locking the belt drum from rotating, the brake being mounted longitudinally on the belt shaft and located between first and second thrust bearings, one of the thrust bearings being longitudinally moveable between a first position on the belt shaft to a second position on the belt shaft and back in response to the winding and unwinding of the safety belt and a converter material which is activated by energy applied thereto to expand longitudinally relative to the belt shaft to control the brake to cause the shaft of the belt drum to be rotationally braked comprising:

activating the converter material when the one thrust bearing is located in the second position to cause the belt shaft and the belt drum to be braked against rotation; and wherein when the one thrust bearing is located in the first position or the second position and the converter material is not activated, unbraked winding and unwinding of the safety belt is possible.

15. The method according to claim 14, wherein the converter material is chosen from the group consisting of: a piezo ceramic, a piezo polymer, a electrostrictive ceramic, a electrorheological fluid, a poly marl, a magnetorheological fluid, a shape memory alloy and a shape memory polymer.

16. The method according to one of claim 14, wherein a piezoelectric stacked actuator is used as the converter material.

17. The method according to claim 14, wherein the converter material longitudinally expands after energy is applied.

18. The method according to claim 14, wherein the applied energy is controlled by data from pre-crash sensors in the vehicle.

* * * * *